United States Patent [19]
Foster

[11] Patent Number: 5,769,639
[45] Date of Patent: Jun. 23, 1998

[54] MULTI-EDUCATIONAL DEVICE

[76] Inventor: Anne Foster, P.O. Box 7241, Port Aransas, Tex. 78373

[21] Appl. No.: 229,840

[22] Filed: Apr. 19, 1994

[51] Int. Cl.[6] .................................................... G09B 1/14
[52] U.S. Cl. ......................... 434/159; 434/167; 434/192; 434/203; 434/207; 434/209; 434/210; 434/188; 434/416; 434/408
[58] Field of Search .................................. 434/191, 192, 434/202, 203, 204, 205, 207, 209, 210, 188, 175, 172, 170, 167, 156, 113, 408, 413, 416, 418, 422, 427, 430

[56] References Cited

U.S. PATENT DOCUMENTS

| | | | |
|---|---|---|---|
| 722,994 | 3/1903 | King | 434/418 |
| 1,694,405 | 12/1928 | Troidl | 434/203 |
| 5,163,845 | 11/1992 | Blassingame | 434/413 X |
| 5,334,026 | 8/1994 | Ylitalo | 434/113 X |

FOREIGN PATENT DOCUMENTS

| | | | |
|---|---|---|---|
| 0018827 | 4/1898 | United Kingdom | 434/192 |
| 2270789 | 3/1994 | United Kingdom | 434/203 |

*Primary Examiner*—Gene Mancene
*Assistant Examiner*—Jeffrey A. Smith

[57] ABSTRACT

A self-corrective, reversible device comprising a handled, slotted framework, on each side of which the top frame is imprinted with inverse mathematical symbols, below which is a number line from one through ten in ascending and descending order. Below the number line, nine channeled horizontal rows each contain ten grooved, colored, movable, workpieces. The first four rows on side "A" teach counting, addition, subtraction and place value. These workpieces have the following values: Row one, "1" each; Row two, "1" each; Row three, "10" each and Row four, "100" each. Workpieces in each row are the same color, but each row is a different color. Corresponding with these four rows in both value and color are four boxes imprinted on an erasable surface contained within the framework. The remaining five rows on side "A" teach large and small letters of the alphabet, phonics and consonant blends. These workpieces are each colored in one of various monochromatic shades with the ten workpieces in the last row also each having one of a variety of textures. On the side of the frame, numerals and color words correspond with the workpieces. Workpieces are in Braille, as Braille is designed in multiples of ten. The reverse, or multiplication/division side, has workpieces with from two through nine dots, with workpieces in the top row each bearing two dots and each succeeding row increasing by one dot per workpiece. Imprinted answer-backboards are designed for insertion in top of the frame for self-correction.

15 Claims, 10 Drawing Sheets

| + | | | | | | | | | | − | | | | | | | | |
|---|---|---|---|---|---|---|---|---|---|---|---|---|---|---|---|---|---|---|
| 1 | 2 | 3 | 4 | 5 | 6 | 7 | 8 | 9 | 10 | 10 | 9 | 8 | 7 | 6 | 5 | 4 | 3 | 2 | 1 |
| 10 | 20 | 30 | 40 | 50 | 60 | 70 | 80 | 90 | 100 | 100 | 90 | 80 | 70 | 60 | 50 | 40 | 30 | 20 | 10 |
| 100 | 200 | 300 | 400 | 500 | 600 | 700 | 800 | 900 | 1000 | 1000 | 900 | 800 | 700 | 600 | 500 | 400 | 300 | 200 | 100 |
| 1000 | 2000 | 3000 | 4000 | 5000 | 6000 | 7000 | 8000 | 9000 | 10000 | 10000 | 9000 | 8000 | 7000 | 6000 | 5000 | 4000 | 3000 | 2000 | 1000 |

Fig. 8B

| × | | | | | | | | | | ÷ | | | | | | | | |
|---|---|---|---|---|---|---|---|---|---|---|---|---|---|---|---|---|---|---|
| 1 | 2 | 3 | 4 | 5 | 6 | 7 | 8 | 9 | 10 | 10 | 9 | 8 | 7 | 6 | 5 | 4 | 3 | 2 | 1 |
| 2 | 4 | 6 | 8 | 10 | 12 | 14 | 16 | 18 | 20 | 20 | 18 | 16 | 14 | 12 | 10 | 8 | 6 | 4 | 2 |
| 3 | 6 | 9 | 12 | 15 | 18 | 21 | 24 | 27 | 30 | 30 | 27 | 24 | 21 | 18 | 15 | 12 | 9 | 6 | 3 |
| 4 | 8 | 12 | 16 | 20 | 24 | 28 | 32 | 36 | 40 | 40 | 36 | 32 | 28 | 24 | 20 | 16 | 12 | 8 | 4 |
| 5 | 10 | 15 | 20 | 25 | 30 | 35 | 40 | 45 | 50 | 50 | 45 | 40 | 35 | 30 | 25 | 20 | 15 | 10 | 5 |
| 6 | 12 | 18 | 24 | 30 | 36 | 42 | 48 | 54 | 60 | 60 | 54 | 48 | 42 | 36 | 30 | 24 | 18 | 12 | 6 |
| 7 | 14 | 21 | 28 | 35 | 42 | 49 | 56 | 63 | 70 | 70 | 63 | 56 | 49 | 42 | 35 | 28 | 21 | 14 | 7 |
| 8 | 16 | 24 | 32 | 40 | 48 | 56 | 64 | 72 | 80 | 80 | 72 | 64 | 56 | 48 | 40 | 32 | 24 | 16 | 8 |
| 9 | 18 | 27 | 36 | 45 | 54 | 63 | 72 | 81 | 90 | 90 | 81 | 72 | 63 | 54 | 45 | 36 | 27 | 18 | 9 |

MULTI-EDUCATIONAL DEVICE

BACKGROUND—FIELD OF INVENTION

This invention relates to a new device and method for learning and teaching mathematics, the alphabet, phonics, Braille, color, geometry, tactile discrimination, and vocabulary.

BACKGROUND—DESCRIPTION OF PRIOR ART

Heretofore, far too many people in the world have suffered needlessly because educational opportunities were either inaccessible, too expensive, or because basic educational principles were presented in a confusing manner.

The primary aim of the present invention is to provide a tool and a method that will help to address those problems: a learning tool which can be adapted for use by students of all nations, by teachers in economically underprivileged classrooms, by the visually handicapped, the illiterate, slow learners and parents who want to teach their children at home where books and learning supplies are limited.

It is a compact, reversible, multi-purpose, multi-educational tool which teaches the basic mathematical principles of counting, addition, subtraction, place value, regrouping, and multiplication and division. It also teaches the alphabet, phonics, color recognition and perception, introduces basic geometric shapes, tactile discrimination, and builds vocabulary.

It includes an erasable surface for writing and computing, a writing instrument and two separate rigid answer-backboards. It may also include separate workpieces for matching colors, letters, phonetic sounds, and textures. Because of its consistently simple method of operation, it is self-teaching, self-progressive, and self-correcting and can be held on a child's lap or, built on a larger scale, may be used in a classroom setting.

After perusing many previous inventions, this inventor found no prior art which addressed all these needs in one invention, nor was any prior art found which employed the unique method or approach to the teaching and learning of the basic educational concepts it contains.

I shall attempt to make this clearer by discussing various aspects of this apparatus and showing the disadvantages of previous educational apparatuses.

MATH: To begin with, the learning of mathematical concepts has often been a bewildering and painful experience; yet there are few concepts in the realm of man's intelligence so simple and logical when taught in a simple, logical manner. The application of inductive and deductive reasoning makes it clear that there are basically two things one can do with numbers, be they fractions, whole numbers, or sets of numbers. Quite simply, they can be made larger or smaller. The process of increasing numbers is the same regardless of whether they are fractions, whole numbers, or sets of numbers as in multiplication and division. The same reasoning can be applied to decreasing numbers. Surprisingly, no prior art was found with numbered, manipulative workpieces which performed mathematical operations by simply sliding the workpieces either to the left or the right and aligning them beneath a number line with an operational symbol.

It is my contention that the majority of man's true learning must progress from the concrete to the abstract. Even the surgeon and plumber cannot become skilled with the scalpel or pipe wrench by simply looking at pictures. The mind cannot begin to grasp abstract symbols such as numerals without actually manipulating numbers of objects first. Consequently, when I began a search for prior art, I was led to movable workpieces such as those on an abacus. Unfortunately, there is nothing particularly simple about a true abacus. The concept, for example, that beads in the same column-admittedly separated-can represent two different amounts, such as ones and fives is an unnecessary mystification of a simple concept. Moreover, the abacus is used predominantly in the oriental world where languages are read in a vertical fashion. It is therefore logical that calculations be performed in the same manner. In the western world, however, we read from left to right. In our cultures, it would seen logical that beginning numerical concepts would be better understood when learned in a horizontal fashion.

PLACE VALUE: The base ten system which employs only ten symbols to represent all numbers is basically quite simple. When written horizontally, any numeral added to the left increases the value of that number ten-fold more than the previous number. In performing operations on this device, the student works with ten workpieces in each row, not nine as I have seen in other patents. With this device, the student quickly sees and understands that any ten workpieces in a row represent one piece in the row immediately below. In other words, that ten ones equal ten, ten tens equal a hundred, and ten hundreds equal a thousand.

In regrouping (carrying or borrowing) addition and subtraction on the present invention, when the tenth workpiece has been used the student stops for a moment, notes the amount still needed on the erasable surface, pushes all ten workpieces to the right or left and exchanges the workpieces for one in the row immediately below. (The stars above the numerals ten are to remind the student of this exchange.) The student then continues adding or subtracting the remaining number he has noted on the erasable surface.

The ones, tens, hundreds and thousands workpieces are of different colors which correspond to the small colored boxes imprinted at the top of the erasable surface. This is used for the purpose of teaching the student how to read and comprehend large numbers. He simply puts the single digit number which represents the number of matching color related workpieces in each row in the answer box of the same color. The student is then able to see and read how many thousands, hundreds, tens and ones have been calculated. When the student learns the special words for the tens, he is then able to read large numbers as they are read by literate users. For example, rather than saying "I have 7 thousands, 6 hundreds, 5 tens and 4 ones", he is able to say, "I have 7 thousand, 6 hundred, fifty, 4." No prior art was found by the inventor which approached this skill in a simple, direct manner, with the workpieces being easily read, manipulated, added, seen and understood by the student.

There should be nothing mystifying about learning or teaching these simple concepts. Regrettably, that is rarely the case. Experiences in learning and teaching mathematics have too often ended in frustration.

MULTIPLICATION/DIVISION: The same method of simple left-to-right manipulation applied to learning on the addition/subtraction/place value side of the apparatus, also applies to the reverse or multiplication/division side. The indicia on the surfaces of the multiplication/division workpieces are raised to enable the student to actually feel each number within a set as he counts.

ANSWER-BACKBOARDS: There are two rigid answer-backboards which can be inserted into the grooved channels on the inner frame on either side of the workpieces. They show the collective numbers of the workpieces above and also teach the use of a grid. The math answer-backboard has addition/subtraction/place value on one side and multiplication/division on the other.

The alphabet/phonics answer-backboard has phonetic pictures for each letter of the alphabet and consonant blends on one side, and lower case alphabet letters on the reverse side.

The answer-backboards may be taken out for testing purposes to see if the student can perform the various functions and concepts independently.

ALPHABET/CONSONANT BLENDS: This section of the present invention was approached in the same manner as the mathematical section, ie. with the idea of incorporating as many concepts as possible in a simple manner, using a small space. Unlike other patents I examined, which teach the alphabet and phonics, the present device permits the student to see and touch the entire alphabet and the consonant blends all together rather than isolating them one at a time. In a manner of speaking, it lays out all that must be learned alphabetically and phonetically at one time in front of the student. The student may simply use the apparatus for identification of capital letters, or with the insertion of one side of the answer-backboard may match the capital letters with the lower case letters or use the phonetic section on the other side in preparation for reading.

The phonetic answer-backboard is imprinted with small pictures with beginning sounds which correspond to the letters of the alphabet and consonant blends. This answer-backboard was done separately from the addition/subtraction section which appears at the top of the device, so students will not be confused or distracted by the particular part of the board with which they are working. None of the prior art I examined performed the learning and teaching of the alphabet, consonant blends and phonetics in this manner.

COLOR: By coloring the alphabetical/consonant blend workpieces in five shades each of the basic colors; red, orange, yellow, green, blue, violet, purple, and brown, the student not only learns color identification and names, but also unconsciously learns color discrimination. The last row of ten workpieces is all of the same shade of gray as it serves a different purpose. There are additional unattached flat workpieces included with the device which match the various shades of colors for a more direct application of learning color discrimination.

GEOMETRY: The four workpieces separating the regular alphabet from the consonant blends are imprinted with four geometric shapes for recognition and added vocabulary. On the answer-backboard sheet which fits behind or beneath the geometric shapes are figures for comparison; beneath the square is a rectangle, beneath the triangle is a pyramid, beneath the circle is an oval/ellipse, beneath the "ice cream cone" is a cylinder. The child is asked "How are these alike?", thus the basic geometric concepts of figures with parallel lines, three angles, curved lines and a combination of these is introduced.

TEXTURE: The last ten workpieces on the bottom row of the alphabet/consonant blend section, are of different textures and patterns from rough to smooth to develop the student's awareness of textures, sense of touch, and to further expand the vocabulary potential of the board through the use of comparative and descriptive words. In addition, ten unattached workpieces of like textures may be used to permit the student to match the various textures on the apparatus.

BRAILLE: The first ten numbers in Braille are the same as the first ten letters of the alphabet, with the addition of a special number sign shown on the top left of the number line of this device. The second ten letters of the Braille alphabet are the same as the first ten, except for a lower dot on the left side, and the last six letters are the same as the second row of ten, except for the addition of a dot on the bottom right side. The letter "W" is an exception as it was not part of the French alphabet used by Braille. Because the present invention incorporates workpieces in multiples of ten, the addition of Braille dots makes it easy to use by the visually handicapped. It is also hoped that by incorporating Braille, sighted students will learn an appreciation and understanding of the use of Braille and become more aware and empathetic to the daily problems faced by the handicapped.

(Only a suggestion of Braille notations is given in the drawings.)

The only educational tools or concepts the inventor would consider prior art are those of the Montessouri method for which the inventor found no patent. Actually most of the concepts in this apparatus are based on that method.

The present invention, however, is an improvement over the Montessouri equipment for the following reasons:

(1) The Montessouri equipment that would be needed to present all the concepts incorporated on this device would be quite costly, which would defeat one of the basic purposes of this device.

(2) The Montessouri equipment would take up a great deal of space.

(3) The Montessouri equipment would be quite expensive and unwieldy to transport.

(4) In mathematics, the "number rods" used in the Montessouri method are quite large and unwieldy for children to handle.

(5) The Montessouri method teaches place value with pieces of papers which are spread out in a large area on the floor. Those pieces can be easily lost or destroyed, unlike the present invention.

(6) Because of the structure of the present apparatus, concepts such as the "unconscious inverse" and the "unconscious commutative" principles are not taught with the Montessouri equipment.

(7) The Montessouri method does not employ a handy erasable surface where students can do computations.*

*For use by an individual, this device is meant to be used flat on a desk or other surface as the inventor believes that is the most natural position for computing and writing. Naturally, built on a larger scale for classroom use, it would include a means of support in order that it might be better viewed by the entire class.

OBJECTS AND ADVANTAGES (a) As the present invention is multi-educational, multi-purpose and double-sided, its production saves energy, space and time over the many separate educational tools which would be needed to replace it, especially if it is made of recycled plastics;

(b) many educational concepts may be learned on one device which can easily be handled by a child;

(c) the present device is extremely easy to use as all calculations are made simply by moving the workpieces from left to right or vice-versa;

(d) because of the arrangement of the pieces, inverse and commutative mathematical principles may be learned almost unconsciously;

(e) no major pieces can be lost or misplaced as all such pieces are contained within the apparatus;

(f) because of broadness in content and simple manner of operation, this device may be used by people of different ages and multiple needs;

(g) by doubling or enlarging the personal size of the preferred embodiment, the invention may be used effectively to teach large groups;

(h) because of its simplicity, it can easily be adapted to software and video or used in conjunction with the same;

(i) it may be used by impoverished schools the world over as it eliminates the need for textbooks, paper and chalkboards, making it even more monetarily, environmentally and culturally appealing;

(j) the apparatus is self-corrective, therefore very little supervision is needed;

(k) because of its simplicity and multiple containments, students may progress at their own rate. It is feasible that a five year old may be working with division, or an older student may go back to addition, subtraction or place value to get a clearer understanding of the inter-relationships of all arithmetical operations;

(m) with an erasable surface and writing instrument, no other tools are needed in preparation for learning or testing computations and comprehension;

(n) the multi-educational aspects of the device break the monotony of working on only one subject;

(o) through moving and aligning the workpieces, manual dexterity is improved in small children;

(p) as the device is small and lightweight, it can be shipped and transported inexpensively throughout the world;

(q) the handle makes the device easy to move about;

(r) the device imprints learning both concretely and visually in a colorfully correlated and stimulating manner;

(s) because of the multi-educational facets contained, the device helps build a wider vocabulary;

(t) the device may simply be used for testing and measuring intelligence and reasoning ability;

(u) by changing only the symbols on the alphabetical workpieces the device may be adapted to any language as the mathematical sections have no words;

(v) as the device incorporates Braille, it places a learning tool for the visually handicapped in areas where such a tool might not be available;

(w) when inserted on both sides, the answer-backboards protect the workpieces and make an attractive carrying case;

(x) the device is so simple to use, children who are familiar with it may teach its concepts to other children or even adults;

(y) teachers may use the answer backboards as a master copy with a xerograph machine for additional classroom work, or they may be used by students for individual practice to learn tens, thousands, multiplication tables, etc.

DRAWING FIGURES

In the drawings, as the device is double-sided and the workpieces are double-faced, the figures have the same numbers but different alphabetical suffixes. For the sake of clarity all capital letter suffixes pertain to the front view or FIG. 1, and all small letter suffixes pertain to the back view or FIG. 2, with the exception of 38a in FIGS. 6 and 9A, which is an answer-backboard for FIG. 1.

Figure 1:
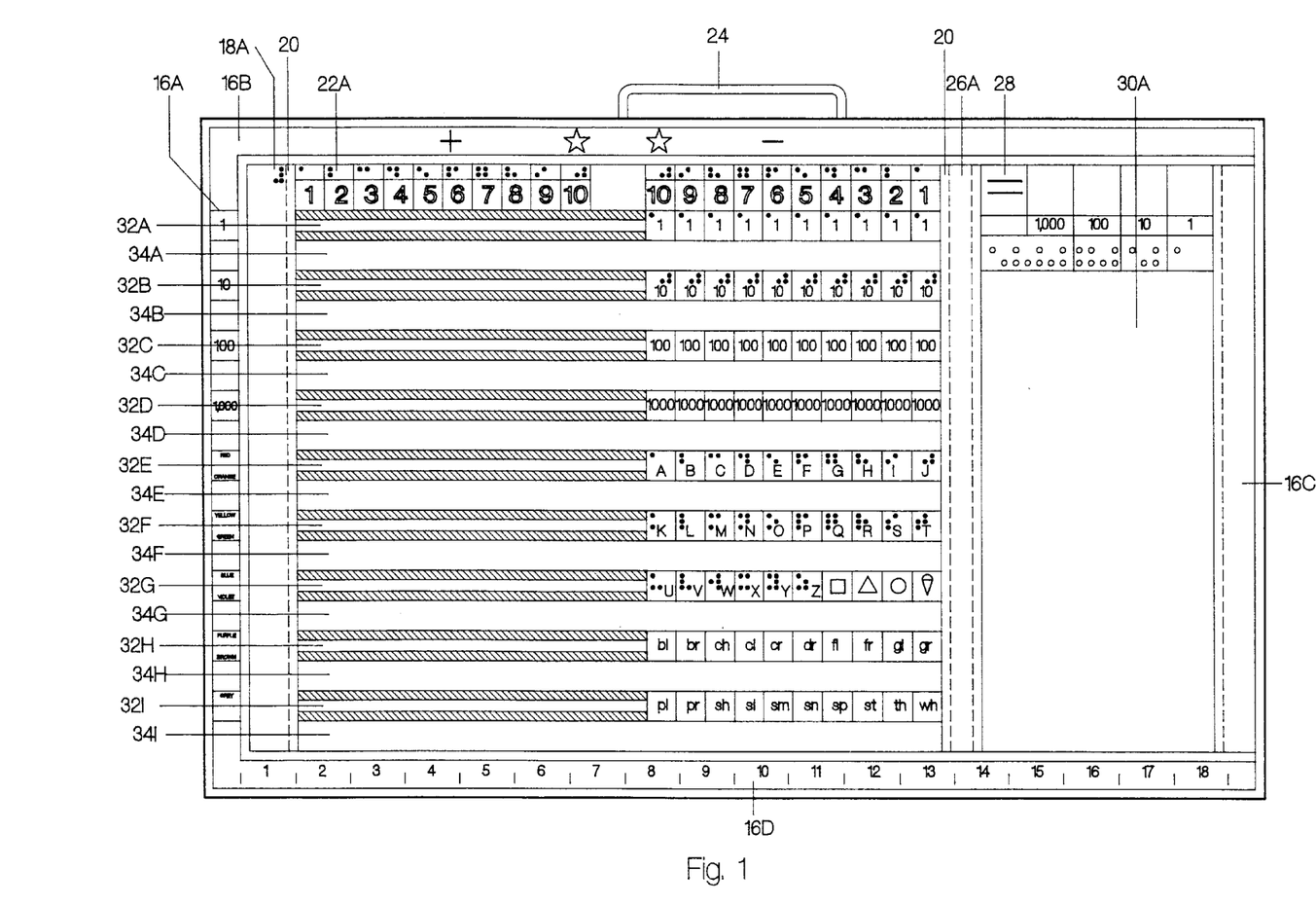
FIG. 1 shows a front view of the device.
Figure 2:
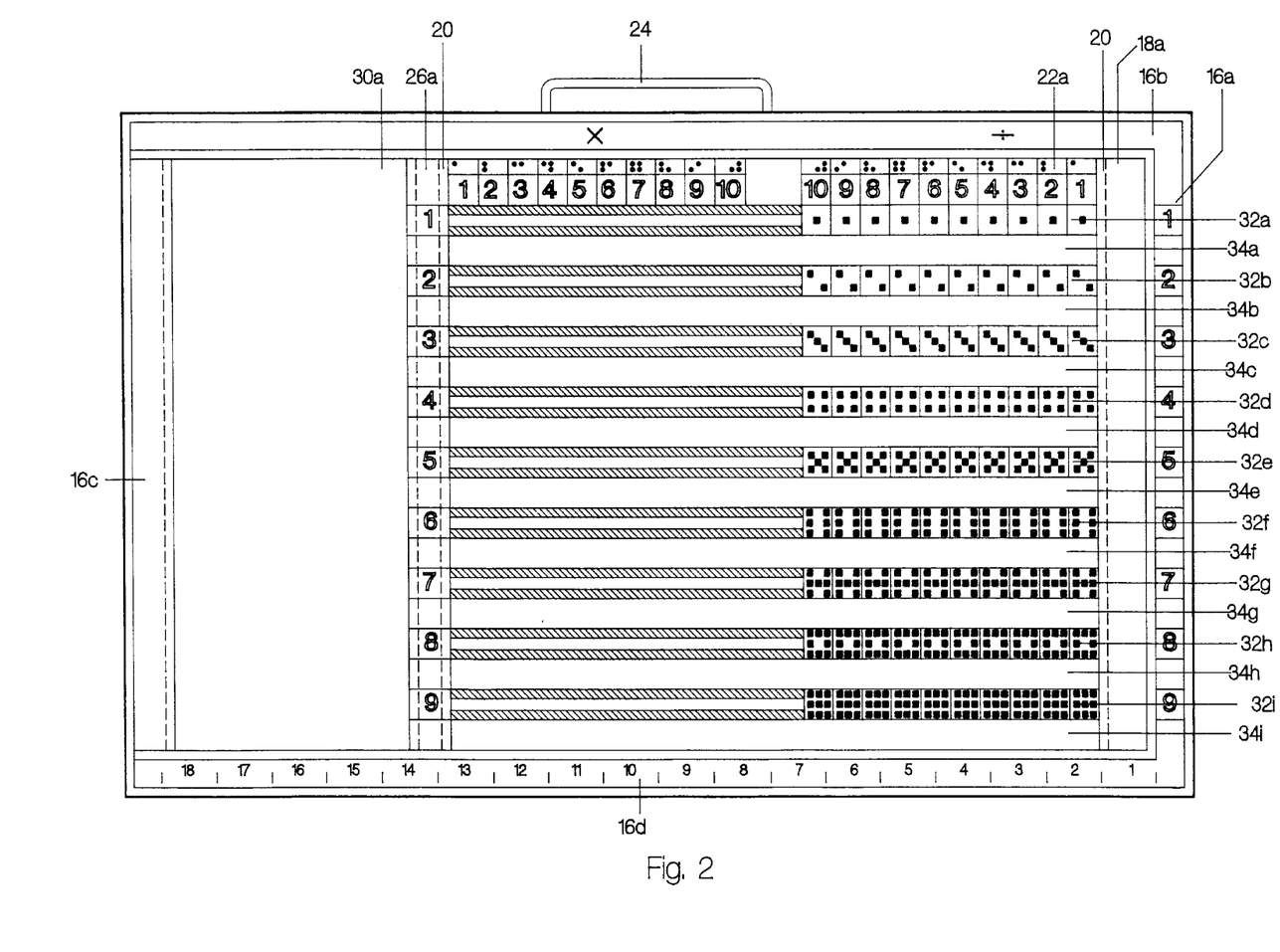
FIG. 2 shows the reverse or backside of the device.

| Reference Numerals In Drawings | |
|---|---|
| 16 A,a | outer left frame of front view, Fig 1, with place value and color-word guides; & right frame of Fig 2 |
| 16 B,b | Top frame with operational symbols, stars and slots for answer-backboards |
| 16 C,c | outer frame right side Fig 1; outer frame left side of Fig 2 |
| 16 D,d | bottom frame and ruler Figs 1 & 2 |
| 18 A,a | inner frame, Fig 1; & inner frame and number guide, Fig 2 |
| 20 | grooves in inner frame for answer-backboards |
| 22 A,a | Number line with Braille dots |
| 24 | handle |
| 26 A,a | right inner frame Fig 1; left inner frame & number line Fig 2 |
| 28 | answer box for place value Fig 1 |
| 30 A,a | front erasable surface; & back erasable surface |
| 32 A–D | rows one–four: workpieces with indicia 1,10,100, and 1000 |

-continued

Reference Numerals In Drawings

Figure 7:
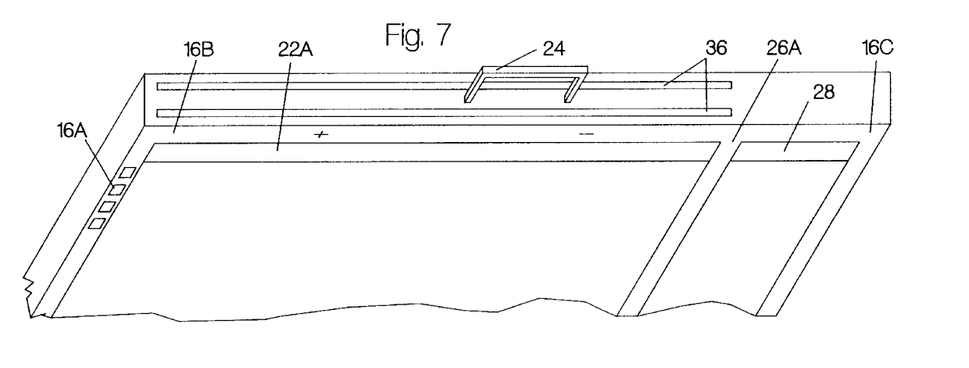
FIG. 7 shows the upper outside frame with slots for the insertion of the answer-backboards.
Figure 8A:
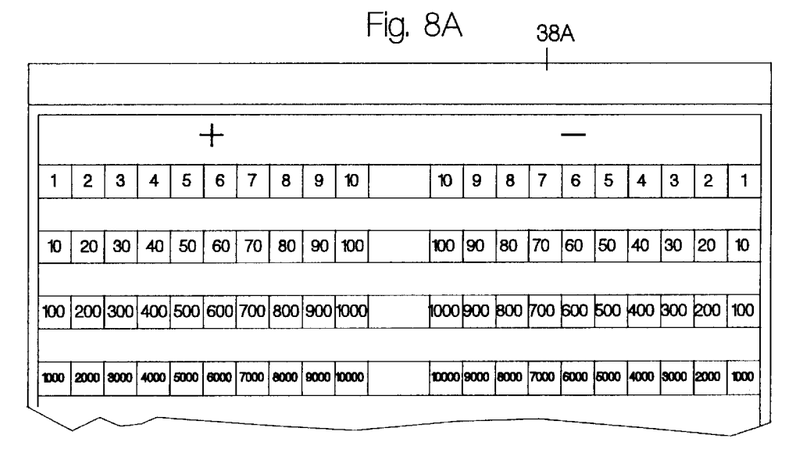
FIG. 8A shows the answer-backboard for addition/subtraction and place value in which the lower area is blank.
Figure 8B:
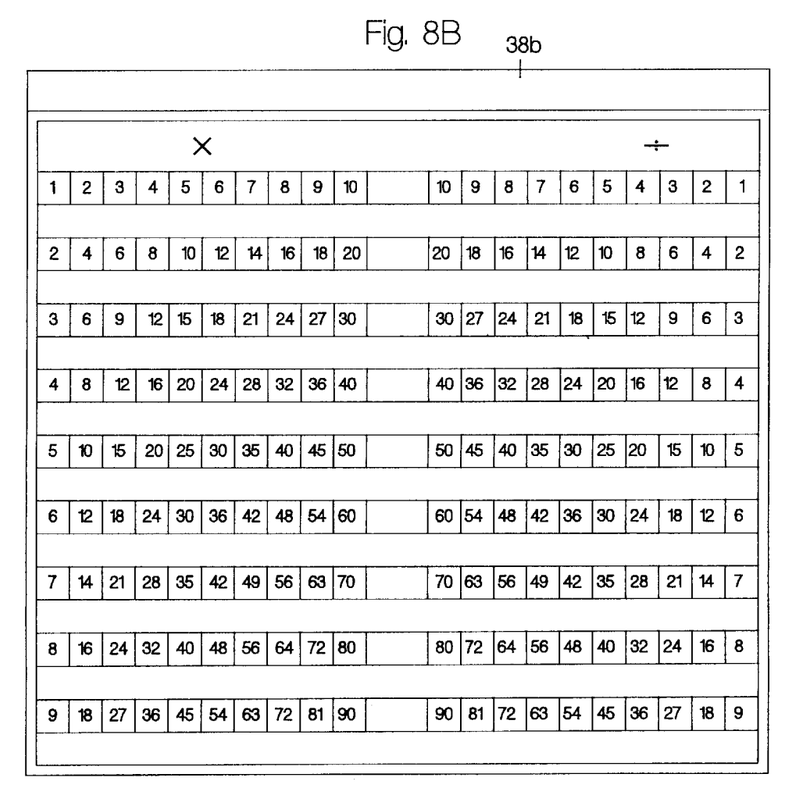
FIG. 8b shows the answer-backboard for the reverse-or multiplication/division side.
Figure 9A:
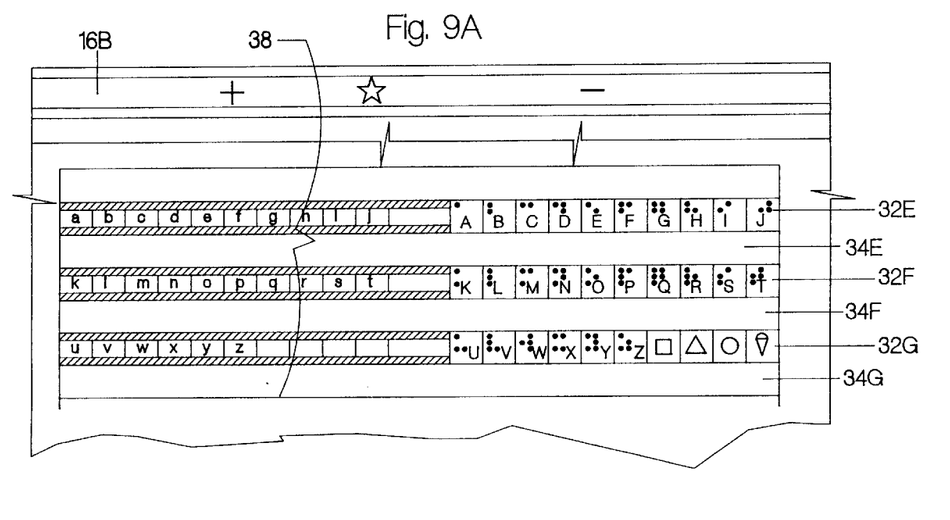
FIG. 9A shows the alphabet answer-backboard for lower case letters as it would appear if inserted.
Figure 9B:
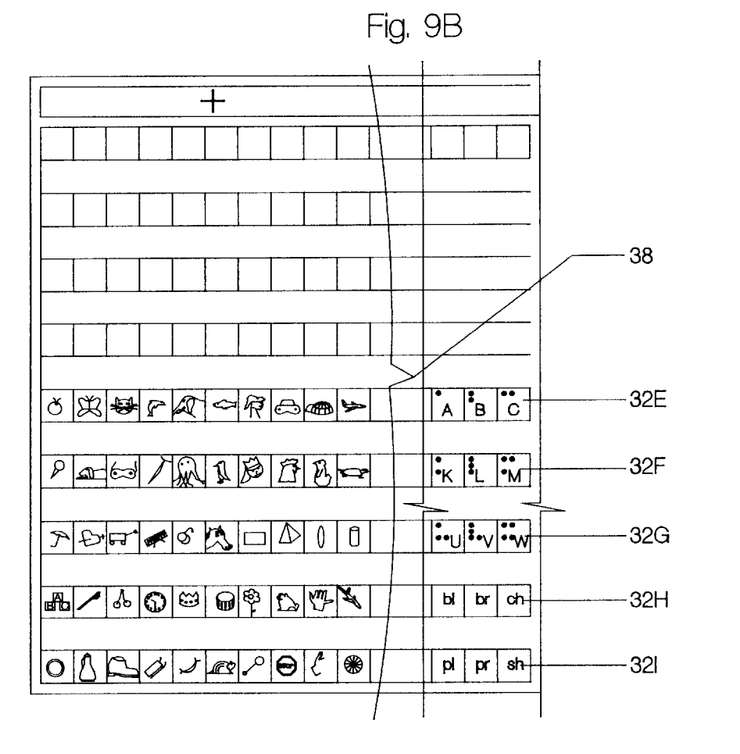
FIG. 9B shows the answer-backboard for the phonetic alphabet, geometric figures and consonant blends.

| 32 E–I | rows five–nine: workpieces in shades of colors and indicia for alphabet, geometric figures and consonant blends; row 32I textured |
|---|---|
| 32 a–i | Fig 2 rows one–nine: workpieces with indicia representing sets from one through nine |
| 34 A–I | Fig 1: dividers/inner horizontal framework for sliding workpieces |
| 34 a–i | Fig 2: dividers/inner horizontal framework for sliding workpieces |
| 36 | Fig 7: slots for inserting answer-backboards |
| 38 A,b | Figs 8A, 8b: answer-backboard for Figs 1 & 2 |
| 38 a,B | Figs 9A, 9B: answer-backboard for Fig 1 |

DESCRIPTION OF INVENTION

FIG. 1 shows a plan view of the front side of the device containing: an outer frame 16A,B,C & D. The left side of the frame 16A has indicia indicating place values for units, tens, hundreds, and thousands, & color indicia for red/orange, yellow/green, blue/violet, purple/brown and gray.

The upper frame 16B is slotted FIG. 7–36 to permit the answer-backboards FIGS. 8A, 8b, 9A, 9B to be inserted and has operational symbols for addition and subtraction and a star above the numerals ten on the number line 22A. The bottom of the frame 16D provides a resting base for the answer-backboards and serves as a measuring line. When the answer-backboards are inserted on both sides, a writing instrument may rest along the bottom divider 34I within the inner frame so it won't be lost.

I refer to 18A/26A as the "inner" frames, though when actually manufactured the left side may be molded as one piece. The inner frames furnish further support for the workpieces and serve as a separation in FIG. 1 between the guide column 16A and the actual workpieces so the numerals in the column will not be confused as part of the calculations with the actual workpieces. These inner frames have vertical grooves 20 for the insertion of the answer-backboards.

The number line 22A, 22a is slightly wider than the dividers 34A–34I, 34a–34i to permit better viewing and is imprinted with Braille along the top and numerals 1–10 in ascending and descending order. The bottom edge of the number line also serves as the upper slider for workpieces in the first row 32A, 32a.

The handle 24 is connected to the upper frame 16B for easier transport and further permits the answer-backboards to remain in place when the device is carried. Naturally, further means may be used to secure the answer-backboards, though it is not necessary. The answer box 28 for reading place value, etc. contains an equal sign. Place value indicia for 1000, 100, 10 and 1 are written in Braille and Arabic numerals beneath the boxes which correspond in color to the workpieces for the same values.

The erasable surface 30A may be made of any material which is erasable. It is contained within vertical grooves along the right side of inner frame 26A and the inner edge of outer frame 16C. Naturally, it may be molded in a different manner.

Row One 32A contains cubical, grooved workpieces all of one color imprinted with the numeral 1 and its Braille equivalent.

The dividers 34A–34I provide a means of separation for the workpieces as well as channels which permit maneuverability. They are of a different color from the workpieces.

The dividers in the upper mathematical section 34A,B,C & D are of a further different color from the dividers for the lower alphabetical section 34E–34I in order that the two sections may be further differentiated.

Row Two 32B contains cubical, grooved workpieces all of one color imprinted with the numeral 10 and its Braille equivalent.

Row Three 32C contains cubical, grooved workpieces all of one color imprinted with the numeral 100 and its Braille equivalent.

Row Four 32D contains cubical, grooved workpieces all of one color imprinted with the numeral 1000 and its Braille equivalent.

Row Five 32E contains cubical, grooved workpieces imprinted with capital letters of the alphabet from A–J and their Braille equivalents. The first five cubes are different shades of red, the second five are of different shades of orange.

Row Six 32F contains cubical, grooved workpieces imprinted with capital letters of the alphabet from K–T and their Braille equivalents. The first five cubes are of different shades of yellow, the second five are of different shades of green.

Row Seven 32G contains cubical, grooved workpieces imprinted with capital letters of the alphabet from U–Z and their Braille equivalents. The last four cubes on the row are imprinted with four geometric figures. The first five cubes of this row are of different shades of blue, the last five are of different shades of violet.

Row Eight 32H contains cubical, grooved workpieces imprinted with consonant blends and their Braille equivalents. The first five cubes are of different shades of purple, the second five cubes are of different shades of brown.

Row Nine 32I contains cubical, grooved workpieces imprinted with consonant blends and their Braille equivalents. These ten cubes are of different shades of gray and are textured from rough to smooth and/or in different patterns.

FIG. 2 shows the reverse side of the board and is obviously the same in construction and operation as that in FIG. 1 except for the operational symbols on the upper frame 16b and the surface indicia. The surface indicia in FIG. 2 indicate sets from one through nine with tiny raised squares (rather than circles like dice) so they will not be confused with the Braille numeral dots used by the visually impaired. The workpieces in FIG. 2 are not surfaced in Braille though they can be used by the visually handicapped in the same manner as they are used by the sighted, ie. to physically feel and count the number within each set.

The only other difference between FIG. 1 and FIG. 2 is that the dividers 34a–34i in FIG. 2 are all of the same color.

Figures 3, 4, 5:
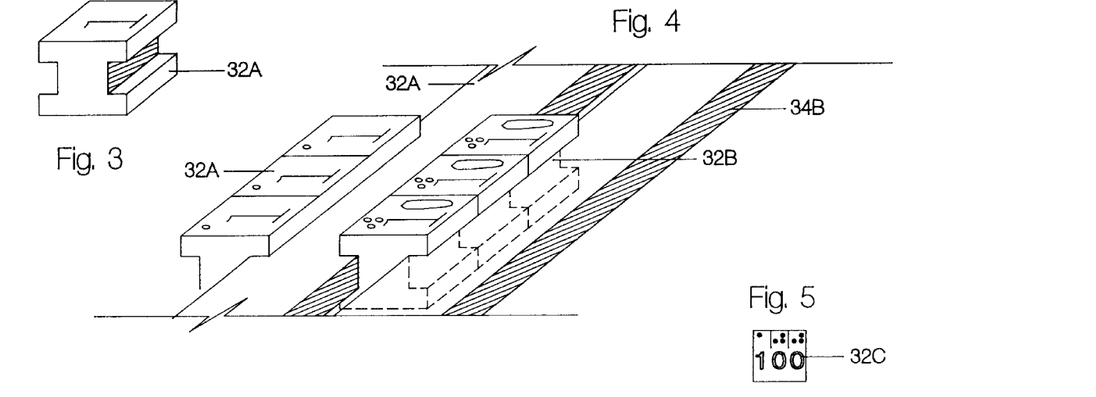
FIG. 3 shows an exploded view of a workpiece.
FIG. 4 shows an exploded view of workpieces in the channels.
FIG. 5 shows the actual size of the front of a ⅝ inch cube with three Braille cells.

FIG. 3 is an exploded view of a workpiece. In the preferred embodiment, the workpieces are roughly of a size from ½ inch to ⅝ inch in order for the apparatus to be easily handled by children. For classroom use the preferred embodiment is built roughly twice the size with roughly one inch workpieces and a means for self-support, still bearing in mind the need for the apparatus to be easily moved about.

FIG. 4 shows the alignment of the workpieces along the dividers and is self-explanatory.

FIG. 5 shows the actual size of the front surface a ⅝ inch workpiece with 3 Braille cells of actual size. As can be seen from the figure, a workpiece of this size can only accommodate 3 cells, therefore in using the apparatus with the visually handicapped to teach place value higher than hundreds, larger workpieces should be used, though once the concept of adding another digit to the left for multiples of ten (as with the tens and hundreds) is established, it is not absolutely necessary. The thousands workpieces, however, are the only ones which require more than 3 Braille cells.

Figure 6:
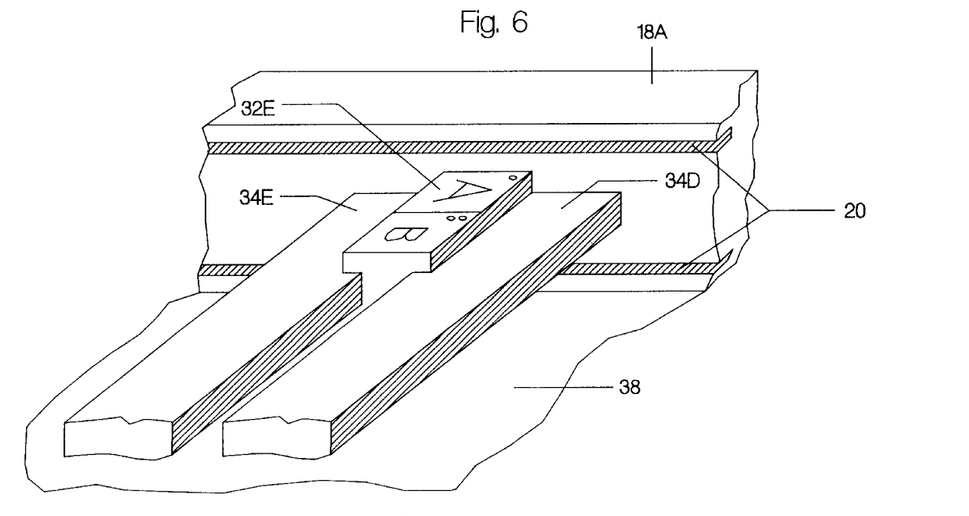
FIG. 6 shows how workpieces in channels fit between the grooves into which the answer-backboards slide.

FIG. 6 shows an exploded view of workpieces in the channels. All the workpieces are centered horizontally halfway along the inner framework 18A, 18a and 26A, 26a so they can be manipulated from either side. Naturally, the workpieces may be mounted in different ways. For example, they could be placed on rods just as easily, however, it was the concern of the inventor that rods might be bent or broken. The workpieces could also be mounted within the channels so they could be moved simply by sliding them with a finger. The inventor prefers, however, that the workpieces be moved by actually feeling the outer surfaces of the pieces as it is believed this will imprint the individual pieces more clearly in the student's mind.

FIG. 7 shows a top view of the upper frame 16B,b on which the handle is mounted. It also shows the slots 36 into which the answer-backboards are inserted so they may be aligned beneath the workpieces. Naturally, the answer-backboards may be inserted in a different manner; however, as the preferred embodiment would be made of a sturdy recycled plastic material the upper frame can easily be molded in the manner shown in this Figure. This permits the answer-backboards to rest more closely beneath the workpieces and also permits them to remain in place when the apparatus is carried by the handle.

FIGS. 8A and 8b show the two faces of the mathematical answer-backboard. The answer-backboards should be made of sturdy plastic and be slightly thicker at the top in order to permit easy removal and insertion into the slots.

FIGS. 9A and 9B show the two faces of the alphabet/consonant blend/geometric answer-backboards.

FIGS. 10–15 show operations on the apparatus and will be discussed in the next section.

Operations

Before beginning a description of the operations of the present device, it should be noted that all mathematical operations in the following figures start with the workpieces on the right hand side of the device. All workpieces are then moved to the left side to begin the problems (as we are dealing with positive numbers). Therefore, the answers to addition, multiplication and subtraction problems will appear on the left hand side. In division, when a problem is completed, there will be no pieces remaining on the left hand side as division is a form of subtraction with sets and simply means "How many sets of this particular number can be taken away or subtracted from the larger (dividend) number until there is nothing left?" The division answer (or quotient) may be noted immediately on the handy erasable surface where the problem has been written. This type of movement makes the operation of the apparatus easy to explain and operate as the workpieces move consistently for all operations. Workpieces are always subtracted or taken away toward the side of the apparatus with the subtraction or division sign.

Following are step by step instructions on how this method and device should be taught in mathematics:

(1) FIRST ROW: 32A FIG. 1

Teach the student to count by moving the workpieces on the first row from the right to the left and aligning them under the number line. The student learns the number words, amounts and number recognition.

(2) ROWS ONE & TWO: 32A, 32B, & the ERASABLE SURFACE

Teach the student the "teens" numbers, pointing out that "teens" is a funny way to say "tens". Numbers with one "1" all have the word "teen" in them except eleven and twelve which are rather peculiar! The student writes "1" on the board, lines up ten on the first row, then erases the zero in the "1" and replaces it with "1". This is then shown on the device by having the student exchange or move the "ones" to the right and one "10" to the left. The student then moves one of the units from the right to the left. The word "eleven" is introduced. The same procedure is repeated until the student gets to "20".

(3) ROW TWO: 32B, the ERASABLE SURFACE, & ANSWER-BACKBOARD 8A

Teach the student the words for the "tens", ie., twenty, thirty, forty, etc. and show how they are written on the answer-backboard and how the answer-backboard fits under those numbers when it is inserted. Afterward proceed to have the student read rows three and four, 32C & D, in the same fashion. All other numbers besides the "teens" and "tens" are said by using the first 9 number words, ie., one hundred, two hundred, or one thousand, two thousand, etc.

Figure 14A:
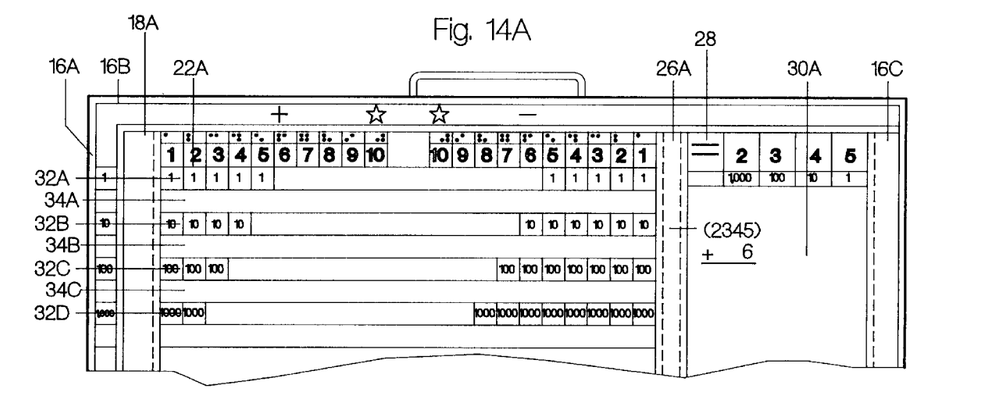
FIGS. 14A, 14B, 14C, and 14D show the process of regrouping (carrying) an addition problem and the use of the answer box at the top of the erasable surface.
Figure 14B:
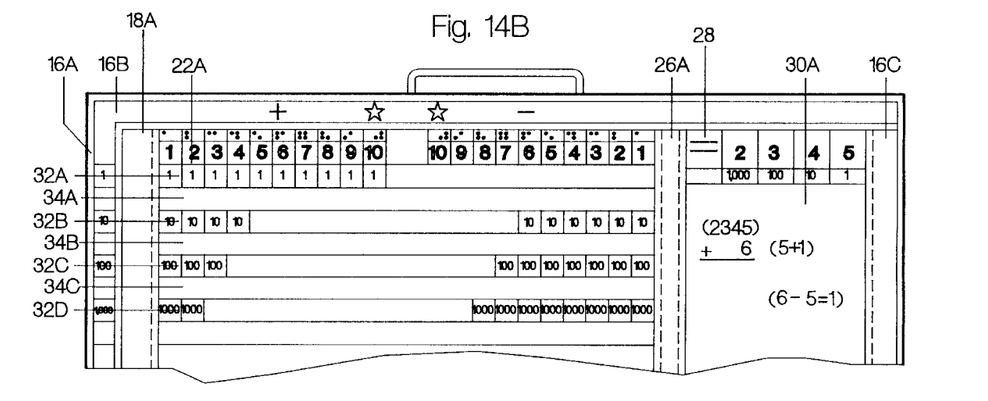
Figure 14C:
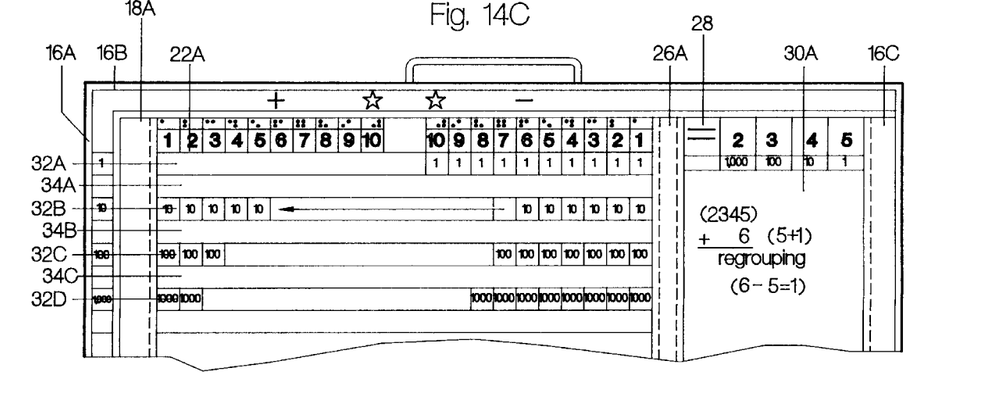

(4) FIG. 14A

This Figure is used for two purposes. First we are going to look only at the number in parentheses and the workpieces which represent those numbers on the device. This shows how a student learns to read place value in conjunction with the answer-box at the top of the erasable surface. For example: the student is asked "Show me 2 thousands. Show me 3 hundreds. Show me 4 tens. Show me 5 ones. Now write the numbers in the answer-box up here which match the color of the cubes you used." After the student has done so, the teacher asks the student to read the number in the answer-box which shows the number of cubes represented. The student will say, "I have 2 thousands, 3 hundreds, 4 tens and 5 ones." The teacher will then ask, "Do you remember how to count by tens? (Pointing to the 4 cubes on the left.) Let's count these by tens. Ten, twenty, thirty, forty. When we come to this 4 in the answer-box we're going to say 'forty' instead of four tens, and we're just going to say '4' and leave the word "ones" off. Let's see if you can say this big number." The student should then say "Two thousand, three hundred, forty-five." Thus the student easily learns place value, and has unconsciously already begun to add. Practice until the student can say any 4 digit number written on the board.

Figure 10A:
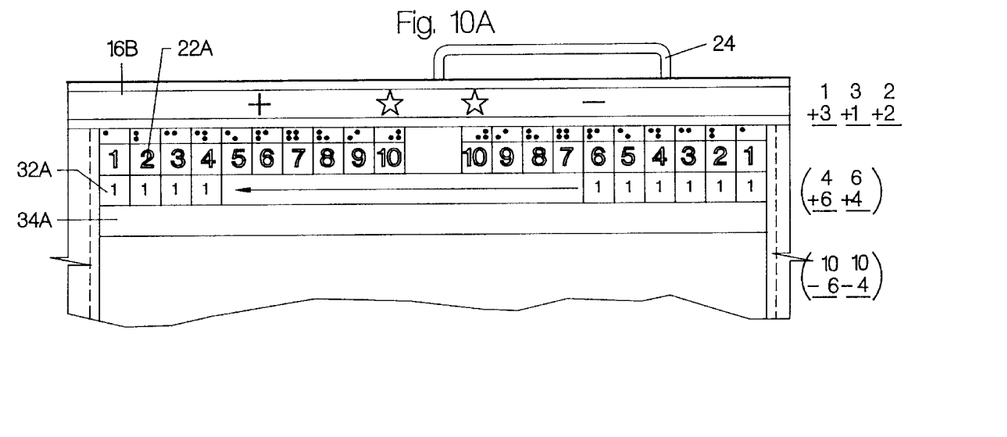
FIG. 10A shows a partial front view of an addition problem and notes the "unconscious inverse" subtraction problems and the "unconscious commutatives" in parentheses.

(5) FIG. 10A

This figure shows the front view of the addition/subtraction/place value side with an addition problem and what I refer to as an "unconscious inverse" subtraction problem and the "unconscious commutative property." The addition of 1+3, 2+2 or 3+1 is shown. By the time the student begins addition, he will already be familiar with the fact that there are ten workpieces or cubes in each row. The student should further be reminded that all problems must begin with all the workpieces on the right hand side. Next, the similarity between the addition and multiplication signs should also be noted, (one is on its side), as should the similarity between the subtraction and division signs (one has two dots on it). This will peak the student's curiosity and make him unconsciously aware that the processes on both sides of the board are going to be related and that there's nothing to be afraid of.

When the child adds 2+2, 1+3, or 3+1, he is at first unconsciously aware that when he moves four pieces away from the right side, the workpieces remaining on that side are aligned beneath the numeral 6 or that 10−6=4 and 4+6=10. This is what I mean by the "unconscious inverse and unconscious commutative" implications of all problems when worked on this device.

It is feasible, therefore, that little effort need be spent teaching the student subtraction, as it will become an unconscious by-product of learning addition. With this device, the student is constantly proving two of the basic laws of mathematics: inverse operations and commutative properties.

Figure 10B:
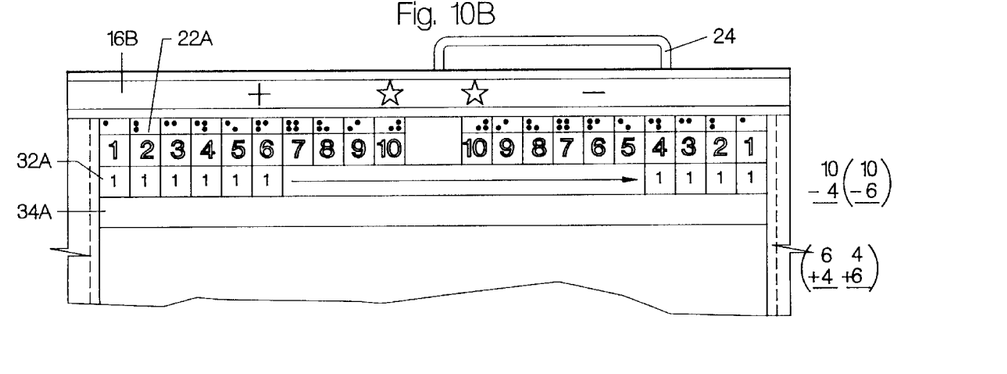
FIG. 10B shows a subtraction problem as it should properly be done and notes the unconscious commutative and inverse.

(6) FIG. 10B

This Figure shows the correct way to subtract. Of course subtraction may also be done on the right hand side, but this will be confusing to the student when he begins to regroup. Further, as has already been pointed out, we are talking about "positive" numbers. In plain language, the student should understand that you have to start with something (positive) before you can take something away. Once again, in this figure, the unconscious inverse and commutative properties are shown.

Figure 11:
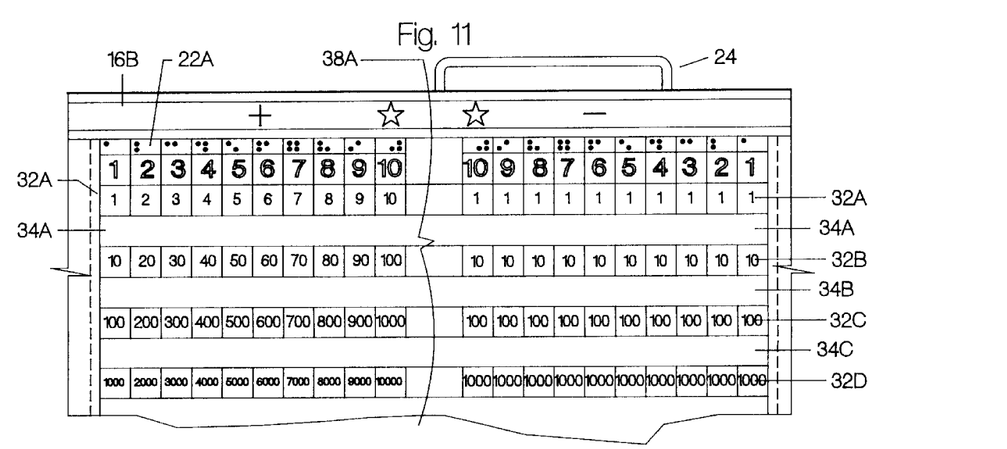
FIG. 11 shows a partial view of the way the device would look with the addition/subtraction backboard inserted and the workpieces on the right.

FIG. 11 shows the way the addition/subtraction/place value section appears when the answer-backboard is inserted.

Figure 12A:
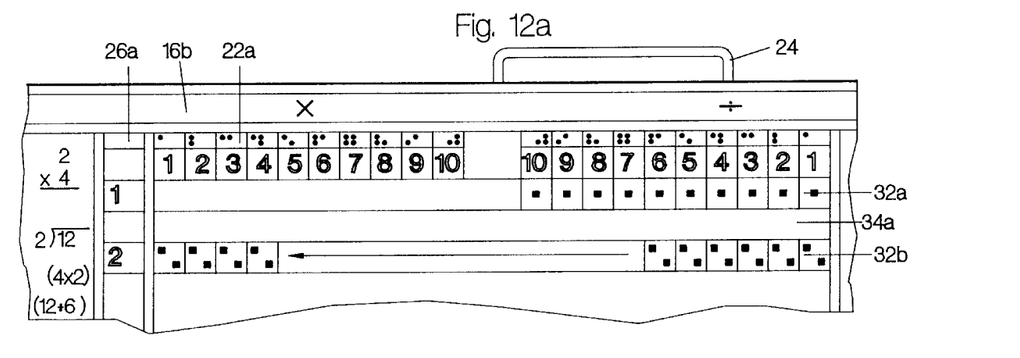
FIG. 12a shows the multiplication/division side of the device with a multiplication problem, an "unconscious division" problem and "unconscious commutative" problems in parentheses.

(7) FIG. 12A

The same concepts apply to FIG. 12*a* for the multiplication/division side of the apparatus. Before beginning multiplication and division, the number of tiny squares or indicia on each workpiece should be counted. The student will see that he has ten workpieces in each row just as he had on the reverse side. He should already know how to count by 2's, 5's and 10's. When the answer-backboard is inserted he will see that under the 10's numerals on the number line, are multiples of 10, ie. 10,20,30,40, etc.

In the problem 2×4, the student will pull 4 workpieces or sets of 2 to the left. He will be unconsciously aware that he has left 6 sets of 2 on the right side. When the answer-backboard is inserted, he can see the numeral "2". He will understand that 20−8=12 and that 12+8=20. The teacher will ask, "How much is 2, four times?" (8). The association between the number line on the top of the board and the number line on the left of the board will become clear and the student will then grasp the concept of the commutative relationship of reading either 2×4 or 4×2 and an understanding of graphs as well.

Figure 12B:
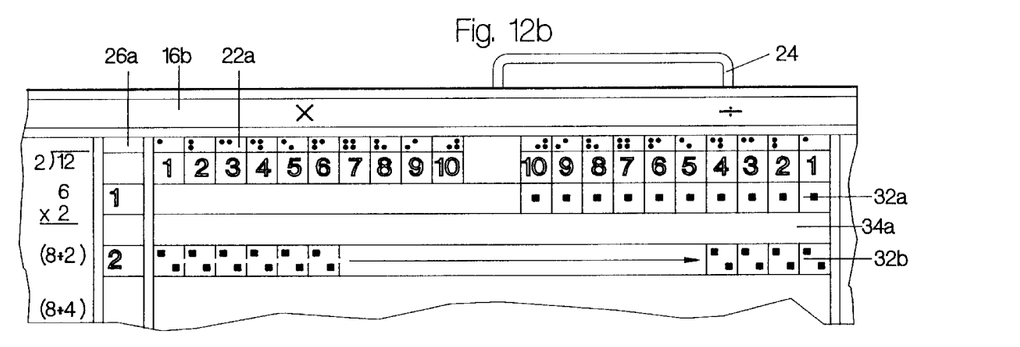
FIG. 12b shows the correct way to perform a division problem with the "unconscious inverse and commutative" problems in parentheses.

(8) FIG. 12*b*

In FIG. 12*b* the student will learn the correct way to do a division problem. In the problem 12 divided by 2, the student will begin counting by 2's until he has 12 on the left hand side. The teacher will ask, "How many sets of 2's can you take away or move to the division side until there are none left on this side?" The student will then count the number of cubes (6) as he moves them to the right and, having arrived at the answer, will note it on the erasable surface. He should quickly catch on that the answer was on the number line above.

Figure 13:
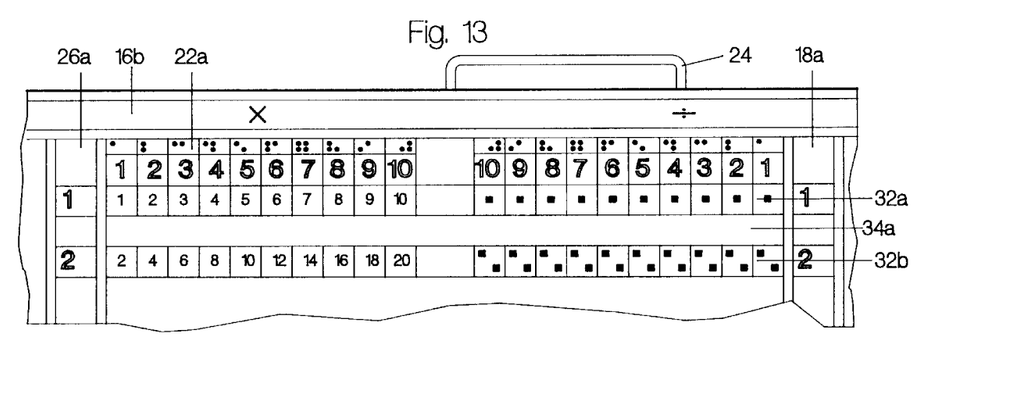
FIG. 13 shows a partial view of the way the multiplication/ division side of the device would look with the answerbackboard inserted.

FIG. 13 shows a partial view of how the device looks with the multiplication/division board inserted.

(9) I have placed multiplication and division before regrouping as that is personally the way I see the level of difficulty when math is learned with this device. Traditionally, however, addition and subtraction facts up to ten have been taught in the first grade, further addition and subtraction facts in the second grade, regrouping and multiplication has been concentrated in the third grade, and division in the fourth. The most natural way is best, ie., when a child or adult expresses an interest in learning some particular section of this apparatus and is successful in comprehending its concepts.

Figure 14D:
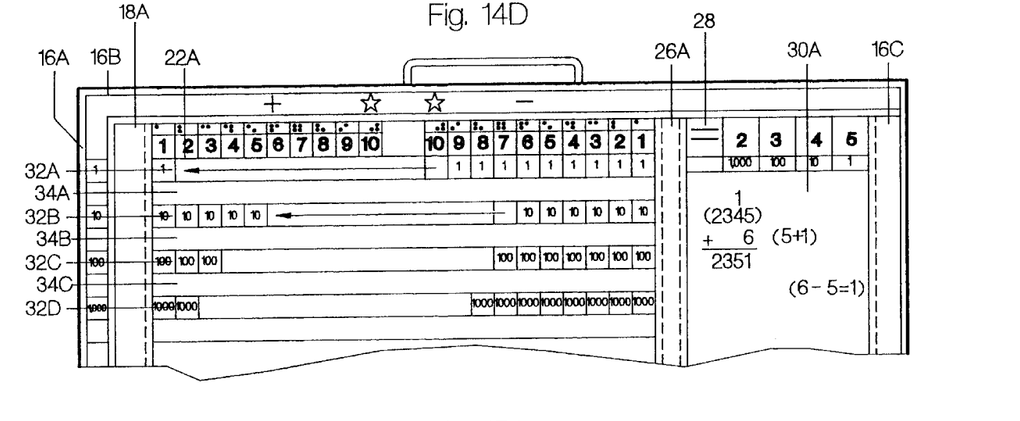

FIGS. 14A–14D show the regrouping (carrying) of an addition problem. The student begins by writing the addend or top number of the problem in the answer-box as indicated in FIG. 14A and moving the appropriate workpieces to the left. He then begins to add 6 to the above, but stops when he gets to five as he has no more "1's" or units to add. The teacher should then ask, "How many more ones do we need to add?" The student should reply, "One". The teacher will continue, "Let's write a problem to show what we're doing and what we need. We've added 5, but we need 6. Do you know how I can show that problem on this little board here? (Help the student to arrive at 5+1=6.) Or, we could say we needed 6 and we've used up 5, so we have one left to add. Can you think of a way we could show that on the board? (Help the student arrive at 6−5=1.) "What do we have to do to get more 1's? Do you remember what happens when the cubes are all filled up under this 10? What does the star mean?" If the device has been taught correctly, the student will remember that he must exchange the full line of 10 "1's" for one "1" on the line below. After he has done so, as in FIG. 14C, the teacher will ask, "How many 10's do we have now? (5) Let's put a little '1' above the 4 in the ten's place. Since this 1 is over the 4, it really means 1 ten, just as the 4 in this place means 4 tens, not 4 ones. Now we're ready to add the last '1' and finish our problem. The student then pulls the last cube over to the left and writes the correct answer in the answer-box at the top of the erasable surface and below the problem as shown in FIG. 14D. It is very important that the teacher be consistent in teaching these operations, as repetition is an important learning tool and consistency eliminates confusion.

Figure 15A:
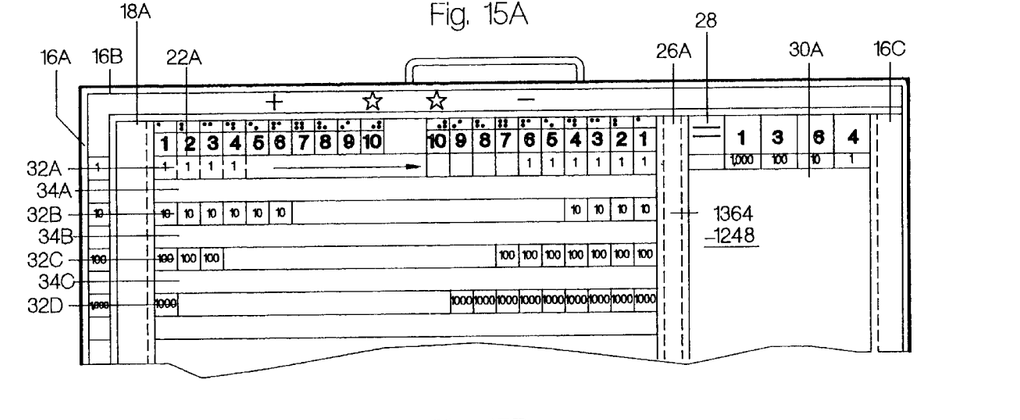
FIGS. 15A, 15B, 15C and 15D show the process of regrouping a subtraction problem and the use of the place value answer box.

(10) FIGS. 15A–15D show the regrouping of a subtraction problem. In FIG. 15A the subtrahend, or top number, is noted in the answer-box and the appropriate workpieces are moved to the left.

Figure 15B:
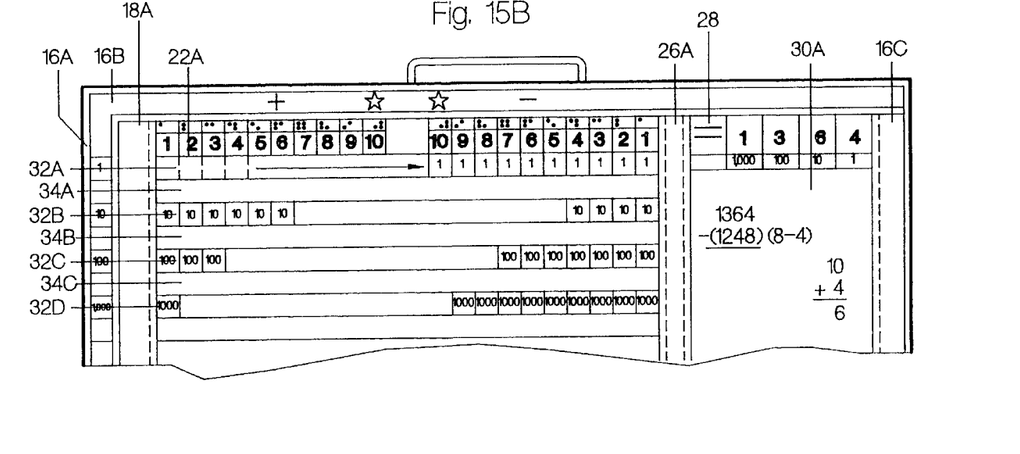
Figure 15C:
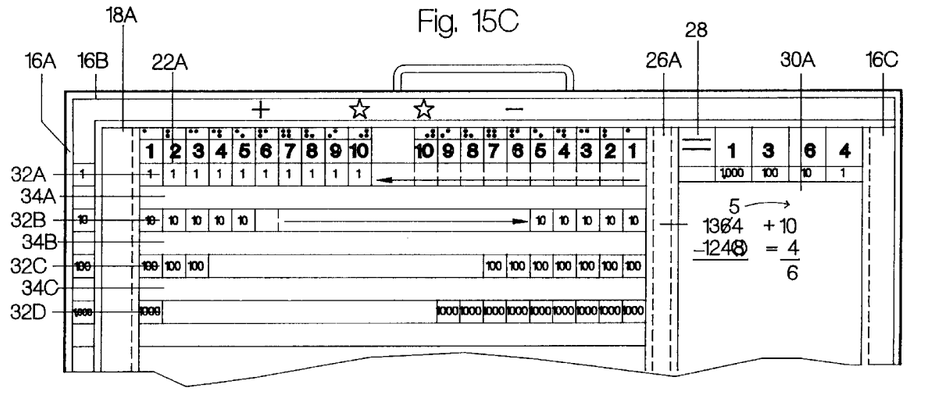

In FIG. 15B, the student starts on the right hand side of the problem in the units column. (With this device, the problem can just as easily be subtracted by starting on the left side, but by tradition, and in order not to confuse the student in later grades or schools, the problem has been shown in the traditional manner.) The student begins by starting to take away 8 of the "1's". When he has taken away four of them, he has no more units left in the top row. The teacher proceeds in much the same manner as explained in FIGS. 14C and 14D as can be seen from the drawings.

The student is asked "How many more do you need to take away?" (4) Let's show this on the board over here. We'll write a 'minus 4 beside this 8 to show that we've used 4 of these 8. What is 8−4? (4) Now, where are we going to find those other four 1's or units?" Help the student see that he has to exchange one of the 10's on the next row as in FIG. 15C. Remind him of what the star means. "How can we show what we just did to the 6 tens on this board?" Help the student arrive at the idea of drawing a line through the 6 and changing it to a 5 as in FIG. 15C. "Let's put the 10 that we borrowed over here above the 4 that we still need to take away. How many will we have left if we take 4 away from the 1's in the top row? How can we show that on the board?" Rather than putting the small "1" beside the 4 in the subtrahend or top number, I suggest this procedure be followed. After a little practice with "borrowing", the student will soon realize that the bottom number below the units (in this problem the 8) is always going to be the same at the top number. (In this problem the 4). The student will soon learn to subtract whatever he has left from the bottom number, from 10 in his head. For example:

$$\begin{array}{cc} \overset{2}{4\cancel{3}5} & 10 \\ -\ 6 & (-5=\underline{1}) \\ \hline 429 & 9 \end{array} \qquad \begin{array}{cc} \overset{7}{16\cancel{8}3} & 10 \\ -\ 37 & (-3=\underline{4}) \\ \hline 1646 & 6 \end{array} \qquad \begin{array}{cc} \overset{4}{\cancel{5}26} & 10 \\ -14\cancel{3} & (4-2=\underline{2}) \\ \hline 38\cancel{3} & 8 \end{array}$$

Figure 15D:
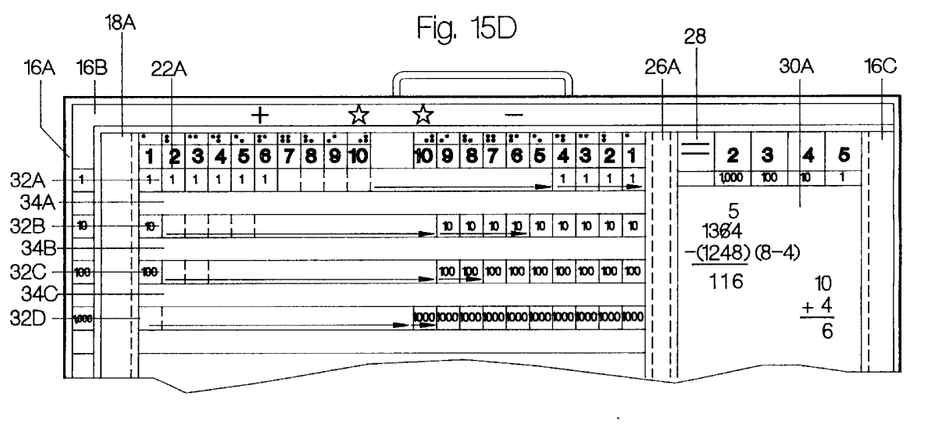

Finally, the student will change the numbers in the answer-box at the top of the erasable surface and show the "difference" below the problem.

The alphabet-consonant blend section is self-explanatory and the geometric figures have already been discussed above.

CONCLUSIONS, RAMIFICATIONS, AND SCOPE OF INVENTION

In conclusion, it is hoped the reader can begin to understand the many functions of which this device is capable and it's multiple advantages. More importantly for the learner, it can simplify concepts that perhaps heretofore had been confusing. Often one finds that a particular field has become so bogged down in academia, it loses sight of its most basic principles. Regrettably, that has happened far too often in the field of education. It is hoped that this invention will address some of those basic principles. In addition to the aforementioned advantages, this invention will help solve other educational problems, namely:

it will eliminate needless confusion in the teaching of mathematical concepts;

it will eliminate needless confusion in the teaching of the alphabet and phonics;

it will address the shortage of tools in the home and classroom for improving color perception through the fine gradations of color employed in the workpieces, and increase artistic ability almost unconsciously;

it will address the shortage of educational "toys" that are self-corrective and can be used independently by children;

it will permit independent progress by improving reasoning processes through conscious and unconscious experiences with its multiple concepts;

it will help to address the shortage of educational tools for the visually impaired, the slow learner and the illiterate;

it will make students aware of those less fortunate such as the blind, and furnish them with a tool to learn to communicate with and aid the handicapped;

it will address the needless expenditure of monies on many different educational tools whose use is soon outgrown;

it will address a crying need in economically deprived homes, cities, villages and Third World countries where there is a shortage of textbooks, educational tools, and even the lack of a measuring devise;

it will furnish "edutainment" in a varied and colorful manner for those families who cannot afford a computer;

it presents educational concepts in such a simple manner that people of all ages will find its many facets informative;

it will give children a clearer understanding of the terms "right" and "left", as those terms will be used often with this device;

it's also great for carrying along when traveling with children!

RAMIFICATIONS

Accordingly, the scope of this invention should be determined not by the preferred embodiment alone, but by the appended claims and their legal equivalents. For example:

it is recognized by the inventor that the method whereby inverse mathematical operations can be shown with movable workpieces bearing indicia indicating numerical value in the manner described in this patent can be applied to mathematical operations other than addition/subtraction and multiplication/division;

it is also recognized that this method can easily be extended to software programs or a video tape which is the inventor's intent;

additionally, it is recognized that each individual educational facet of this invention may be enlarged in like manner of operation to encompass a single apparatus. The evolution of the many concepts contained in the present invention were refined and combined not because they would not have been individually effective, but, as has been explained, specifically because the inventor believed the present invention would serve a greater purpose when constructed in a manner similar to the preferred embodiment. Individual construction of the multiple elements while attractive on their own would have departed from the multiple needs previously set forth and altruistic intent of the inventor. Once the preferred embodiment becomes available, it may become desirable to pursue individual facets and devices.

Obviously there are many possibilities as well with regard to the relative disposition of workpieces, design, embodiments, construction materials, etc.

The preferred embodiment should not be construed as limiting the scope of the invention, but rather as an exemplification of one preferred embodiment thereof.

I claim:

1. A multi-educational device comprising:
   (a) a framework comprising an inner frame portion and outer frame portion,
      (i) said outer frame portion comprising a first vertical part having at least one vertical groove extending therealong, a second vertical part having at least one vertical groove extending therealong, a first horizontal part having a slot therethrough, and a second horizontal part, each of said first horizontal part and said second horizontal part having ends which are respectively connected to each of said first vertical part and said second vertical part, and
      (ii) said inner frame portion comprising a first vertical element connected at respective ends to said first and second horizontal parts, and means for slidably carrying a plurality of educational workpieces on said framework;
   (b) a number line on said framework, said number line comprising numbers arranged in a first linear group and numbers arranged in a second linear group, said first group numbers being arranged in an ascending numerical order and said second group numbers being arranged in a descending numerical order relative to said first group numbers;
   (c) two inverse operational mathematical symbols, said symbols comprising a first operational mathematical symbol located on said framework and above said first group numbers and a second operational mathematical symbol located on said framework and above said second group numbers;

(d) a plurality of educational workpieces, each of said workpieces having at least first and second opposite surfaces with at least one of said surfaces bearing educational indicia, and each of said workpieces comprising means for allowing slidable engagement relative to said carrying means;

(e) at least one answer-backboard slidably and removably held by said first vertical groove and said second vertical groove, said answer-backboard comprising educational indicia for comparison to said educational indicia on said workpieces: and (f) at least one easily erasable surface affixed within said framework, said easily erasable surface being in abutting position with said first vertical element, said first horizontal part, said second horizontal part, and said second vertical element.

2. The multi-educational device according to claim 1, wherein said means for slidably carrying a plurality of educational workpieces on said framework comprises a plurality of slats, each of said slats being attached at a first end to and extending from said first vertical part of said outer frame portion horizontally to said first vertical element of said inner frame portion, and each of said slats being attached at a second end to said first vertical element of said inner frame portion and being arranged in parallel relative to others of said slats.

3. The multi-educational device according to claim 2, wherein some of said workpieces are separated from others of said workpieces by said slats.

4. The multi-educational device according to claim 1, wherein each of said plurality of workpieces is colored on at least one of said first and second surfaces.

5. The multi-educational device according to claim 1, wherein said means for allowing slidable engagement relative to said carrying means comprises at least one groove.

6. The multi-educational device according to claim 1, wherein a number of said educational workpieces form members of a plurality of groups, each member of each group having the same said educational indicia, said same educational indicia comprising numerical indicia identifying one of a plurality of ordered place values, and said same educational indicia comprising one of a plurality of unique colors, each said plurality of groups comprising a different one of said numerical indicia and a different one of said plurality of colors; and wherein said easily erasable surface comprises a plurality of answer boxes arranged thereon, each of said answer boxes having numerical indicia adjacent thereto numerically identifying each of said answer boxes as having a different one of said plurality ordered place values, said easily erasable surface further comprising a plurality said unique colors thereon, each of said colors being associated with a one of said place values and corresponding to one of said groups.

7. The multi-educational device according to claim 1, wherein said workpiece educational indicia for a number of said workpieces comprises Braille indicia, and wherein said number line is inscribed in Braille notation.

8. The multi-educational device according to claim 1, wherein said workpiece educational indicia for a number of said workpieces comprises numerical indicia and a number of said answer-backboard educational indicia comprises numerical indicia.

9. The multi-educational device according to claim 1, wherein said workpiece educational indicia for a number of said workpieces comprises alphabetic indicia and a number of said answer-backboard educational indicia comprises alphabetic indicia.

10. The multi-educational device according to claim 1, wherein said workpiece educational indicia for a number of said workpieces comprises phonetic picture indicia and a number of said answer-backboard educational indicia comprises phonetic picture indicia.

11. The multi-educational device according to claim 1, wherein a number of said workpieces have one of a variety of textures on at least one of said first and second surfaces thereof.

12. The multi-educational device according to claim 1, wherein at least two of said opposite surfaces of each of said workplaces bear respective educational indicia.

13. The multi-educational device according to claim 1, further comprising handle means for facilitating carrying of said device.

14. The multi-educational device according to claim 1, further comprising means for measuring imprinted on said framework.

15. The multi-educational device according to claim 1, wherein said workpiece educational indicia for a number of said workpieces comprises alphabetical indicia.

* * * * *